United States Patent
Hemmer (10) Patent No.: US 11,094,087 B2
(45) Date of Patent: Aug. 17, 2021

(54) DUAL SERVING SCHEME FOR LOD SEQUENCES

(71) Applicant: GOOGLE LLC, Mountain View, CA (US)

(72) Inventor: Michael Hemmer, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 16/450,280

(22) Filed: Jun. 24, 2019

(65) Prior Publication Data
US 2020/0402261 A1    Dec. 24, 2020

(51) Int. Cl.
*G06T 9/00* (2006.01)
*G06T 17/20* (2006.01)
*H04L 29/06* (2006.01)

(52) U.S. Cl.
CPC ............... *G06T 9/00* (2013.01); *G06T 17/20* (2013.01); *G06T 2210/36* (2013.01); *H04L 67/42* (2013.01)

(58) Field of Classification Search
None
See application file for complete search history.

(56) References Cited

U.S. PATENT DOCUMENTS

| | | | | |
|---|---|---|---|---|
| 5,929,860 A * | 7/1999 | Hoppe | ............... | G06T 17/20 345/419 |
| 6,075,540 A * | 6/2000 | Hoppe | ............... | G06T 17/20 345/419 |
| 6,167,159 A * | 12/2000 | Touma | ............... | G06T 9/001 345/419 |
| 6,262,737 B1 * | 7/2001 | Li | ............... | G06T 17/20 345/419 |
| 6,426,750 B1 * | 7/2002 | Hoppe | ............... | G06T 17/20 345/423 |
| 6,563,500 B1 * | 5/2003 | Kim | ............... | G06T 9/001 345/419 |
| 6,587,104 B1 * | 7/2003 | Hoppe | ............... | G06T 17/20 345/423 |

(Continued)

OTHER PUBLICATIONS

Li, Pengfei, XiaoQing Yu, and Jingjing Wang. "Progressive compression and transmission of 3D model with WebGL." 2016 International Conference on Audio, Language and Image Processing (ICALIP). IEEE, 2016.*

(Continued)

*Primary Examiner* — Sultana M Zalalee
(74) *Attorney, Agent, or Firm* — Brake Hughes Bellermann LLP (57) ABSTRACT

Techniques of compressing level of detail (LOD) data involve generating a codec that can perform progressive refinement on a single rate decoded LOD. Nevertheless, by generating a small amount of extra information in a single rate decoded LOD, a progressive refiner can use the information provided in the single rate decoded LOD to refine the LOD. For example, in some implementations, the extra information is a corner of a face of a mesh; the progressive decoder may then begin traversal of the mesh from that corner for refinement. It is noted that the single rate decoded LODs are able to be refined by the same refinement information as the progressively decoded LODs.

18 Claims, 5 Drawing Sheets

(56) References Cited

U.S. PATENT DOCUMENTS

| | | | | |
|---|---|---|---|---|
| 6,850,638 | B1* | 2/2005 | Lounsbery | G06T 17/205 345/420 |
| 8,970,583 | B1* | 3/2015 | Overbeck | G06T 17/05 345/419 |
| 10,115,231 | B1* | 10/2018 | Bryson | G06T 15/50 |
| 2002/0158865 | A1* | 10/2002 | Dye | G06T 15/10 345/419 |
| 2002/0167516 | A1* | 11/2002 | Loop | G06T 17/20 345/423 |
| 2005/0131660 | A1* | 6/2005 | Yadegar | H04N 19/90 703/2 |
| 2006/0290695 | A1* | 12/2006 | Salomie | G06T 17/20 345/420 |
| 2010/0266216 | A1* | 10/2010 | Choe | H04N 19/54 382/233 |
| 2010/0328311 | A1* | 12/2010 | Lakshmanan | G06K 9/00214 345/427 |
| 2012/0013608 | A1* | 1/2012 | Ahn | H04N 19/61 345/419 |
| 2012/0013746 | A1* | 1/2012 | Chen | G11B 27/034 348/180 |
| 2012/0188241 | A1* | 7/2012 | Ahn | G06T 17/20 345/420 |
| 2013/0114910 | A1* | 5/2013 | Mammou | G06T 9/004 382/233 |
| 2014/0168360 | A1* | 6/2014 | Ahn | G06T 9/001 348/42 |
| 2015/0262421 | A1* | 9/2015 | Bell | G06T 17/20 345/423 |
| 2019/0378341 | A1* | 12/2019 | Xie | G06T 19/20 |
| 2020/0161004 | A1* | 5/2020 | Shirazian | A61B 6/032 |

OTHER PUBLICATIONS

K. Mamou, T. Zaharia, F. Pr teux, "TFAN: A low complexity 3D mesh compression algorithm", Computer Animation and Virtual Worlds, vol. 20(2-3), 343-354, 2009.*

"Draco 3D Graphics Compression", DRACO 2018, retrieved on Apr. 8, 2018 from https://google.github.io/draco/, 3 pages.

"Libjpeg library", PJPEG 2018, retrieved on Nov. 11, 2018 from http://libjpeg.sourceforge.net/, 1 page.

Alliez, et al., "Progressive Compression for Lossless Transmission of Triangle Meshes", Proceedings of the 28th Annual Conference on Computer Graphics and Interactive Techniques (SIGGRAPH '01), 2001, pp. 195-202.

Caillaud, et al., "Progressive Compression of Arbitrary Textured Meshes", Computer Graphics Forum (Proceedings of Pacific Graphics), vol. 35, No. 7, 2016, 10 pages.

Deering, "Geometry Compression", Proceedings of the Annual Conference on Computer Graphics and Interactive Techniques (SIGGRAPH '95), 1995, pp. 13-20.

Garland, et al., "Surface Simplification Using Quadric Error Metrics", Proceedings of the 24th Annual Conference on Computer Graphics and Interactive Techniques (SIGGRAPH '97), 1997, pp. 209-216.

Guo, et al., "Subjective and Objective Visual Quality Assessment of Textured 3D Meshes", vol. 14, Issue 2, Article 11, Oct. 2016, 20 pages.

Hoppe, "New Quadric Metric for Simplifying Meshes with Appearance Attributes", Proceedings of the 10th IEEE Visualization Conference (VIS '99), Oct. 1999, pp. 59-66.

Hoppe, "Progressive Meshes", Proceedings of the 23rd Annual Conference on Computer Graphics and Interactive Techniques (SIGGRAPH '96), 1996, pp. 99-108.

Lavoue, et al., "Progressive Streaming of Textured 3D Models in a Web Browser", Proceedings of the 20th ACM SIGGRAPH Symposium on Interactive 3D Graphics and Games (I3D '16), 2016, p. 203.

Lee, et al., "Adaptive Coarse-to-Fine Quantization for Optimizing Rate-distortion of Progressive Mesh Compression", Proceedings of Vision, Modeling, and Visualization, 2009, pp. 73-82.

Lee, et al., "Rate-distortion optimization for progressive compression of 3D mesh with color attributes", The Visual Computer, vol. 28, Issue 2, Feb. 2012, pp. 137-153.

Maglo, et al., "3D Mesh Compression: Survey, Comparisons, and Emerging Trends", ACM Computing Surveys, vol. 47, No. 3, Article 44, Feb. 17, 2015, 41 pages.

Pajarola, et al., "Compressed Progressive Meshes", IEEE Transactions on Visualization and Computer Graphics, vol. 6, No. 1, Jan. 2000, pp. 79-93.

Peng, et al., "Geometry-guided Progressive Lossless 3D Mesh Coding with Octree (OT) Decomposition", SIGGRAPH '05, 2005, 8 pages.

Rossignac, "Edgebreaker: Connectivity Compression for Triangle Meshes", IEEE Transactions on Visualization and Computer Graphics, vol. 5, No. 1, Jan. 1999, pp. 47-61.

Sander, et al., "Texture Mapping Progressive Meshes", Proceedings of the 28th Annual Conference on Computer Graphics and Interactive Techniques (SIGGRAPH '01), 2001, pp. 409-416.

Tian, et al., "BaTex3: Bit Allocation for Progressive Transmission of Textured 3-D Models", IEEE Transactions on Circuits and Systems for Video Technology, vol. 18, No. 1, 2008, pp. 23-35.

Touma, et al., "Triangle Mesh Compression", Proceedings of the Graphics Interface Conference, 1998, pp. 26-34.

Wallace, "The JPEG still picture compression standard", Communications of the ACM, vol. 34, No. 4, Apr. 1991, pp. 30-44.

Wang, et al., "Multiscale structural similarity for image quality assessment", Proceedings of the 37th IEEE Asilomar Conference Signals, Systems and Computers, Nov. 2003, 5 pages.

Yang, et al., "Optimized Mesh and Texture Multiplexing for Progressive Textured Model Transmission", Proceedings of the ACM International Conference on Multimedia (MULTIMEDIA), 2004, pp. 676-683.

* cited by examiner

DUAL SERVING SCHEME FOR LOD SEQUENCES

TECHNICAL FIELD

This description relates to compression of three-dimensional object data.

BACKGROUND

Some applications such as mapping applications involve representing three-dimensional objects to a user. In one example, a mapping application may require the representation of buildings. In such an application, each such building includes a triangular mesh having a plurality of vertices, i.e., points in space that form triangles. Such a triangular mesh involves a plethora of data that may be stored on disk and transmitted to the user. Practical implementations of storing and transmitting the triangular mesh data representing a virtual object include compressing the triangular mesh data.

SUMMARY

In one general aspect, a method can include receiving, by processing circuitry of a server computer, surface data related to a surface of a three-dimensional object. The method can also include performing, by the processing circuitry, (a) a progressive encoding on the surface data to produce progressive encoded surface data and (b) a subsequent progressive decoding operation on the progressive encoded surface data to obtain (i) a first level of detail (LOD) representing the surface, (ii) a second LOD representing the surface that has less detail than the first LOD, (iii) a third LOD representing the surface that has less detail than the second LOD, and (iv) first refinement data representing the first LOD as a refinement of the second LOD. The method can further include performing, by the processing circuitry, (a) a single rate encoding of the first LOD to obtain a first single rate compressed data package representing the first LOD and (b) a single rate encoding of the second LOD to obtain a second single rate compressed data package representing the second LOD. The method can further include performing, by the processing circuitry, a single rate decoding of the second single rate compressed data package to produce a second single rate decoded LOD.

Alternatively, the first LOD can be generated in a progressive decoding step from the second LOD and the recovery data produced by the progressive encoder during reduction. In case the second LOD has been single rate decoded the decoder can use the configuration data to initialize the decoder appropriately to recover the first LOD from the second LOD and the recovery data. The method can further include generating, by the processing circuitry, progressive indicator data from the first refinement data and the second single rate-decoded LOD, the progressive indicator data enabling a refinement of the second single rate decoded LOD in combination with the first refinement data.

The details of one or more implementations are set forth in the accompanying drawings and the description below. Other features will be apparent from the description and drawings, and from the claims.

DETAILED DESCRIPTION

A conventional approach to compressing such triangular mesh data involves a parallelogram prediction in a single rate encoder. In this single rate encoder, the position of a vertex is predicted to complete the parallelogram formed by the vertices of a neighboring triangle and only a corrective vector is stored. The sequence of correctors, which tend to spread around the zero vector, can be compressed more compactly than the sequence of positions.

Another conventional approach to compressing the triangular mesh data involves mesh refinement in a progressive encoder. In this progressive encoder, the refinement rules are built into the encoding. Accordingly, the decoding process begins with a very coarse mesh from which successive levels of detail (LODs), i.e., finer meshes are displayed with each mesh refinement.

A technical problem involved in the above-described conventional approaches to compressing triangular mesh data is that the above-described conventional approaches to compressing triangular mesh data take too much time and may result in a suboptimal decoding experience for a user. For example, providing high resolution geometric content to a user on a client on demand takes a significant amount of time. While this time can be reduced by efficient encoding schemes, it is desired to minimize the inconvenience of the user while waiting. Some mapping applications attempt such a minimization by loading a sequence of models so that they can already show something to the user, as an example, presenting the Eiffel Tower in a mapping application. However, such applications do so by separately loading every LOD that is available to them. This causes significant overhead with respect to the amount of downloaded data, which means wait time for the user.

It is noted that, while both a single rate decoded and progressive-decoded LOD may represent the same LOD, the way these decoded LODs are stored in memory are different. For example, a progressive-decoded LOD is arranged so that the progressive refiner on the client has sufficient information from which to perform refinement steps to generate higher LODs. Single rate decoded LODs, in contrast, produce a single LOD upon decoding which is not configured for refinement. Accordingly, the order in which the single rate decoded LODs and progressive decoded LODs store information may be different. The tradeoff is that the client may be able to get a higher single rate LOD but cannot refine that LOD decoded with a progressive refiner, because the progressive refiner has no information about traversing a mesh of the LOD.

A technical solution to the above-described technical problem involves generating a codec that can perform progressive refinement on a single rate decoded LOD. Nevertheless, by generating a small amount of extra information in a single rate decoded LOD, a progressive refiner can use the information provided in the single rate decoded LOD to refine the LOD. For example, in some implementations, the extra information is a corner of a face of a mesh; the progressive decoder may then begin traversal of the mesh from that corner for refinement. It is noted that the single rate decoded LODs are able to be refined by the same refinement information as the progressively decoded LODs.

Note that the server may encode and decode each LOD as a separate single rate encoded and decoded LOD as well as a progressive encoded LOD. As each single rate encoded LOD is a very compact format with regard to transmission costs to clients, a technical advantage of the above-described technical solution is that the client may select any strategy for decoding that provides the best experience. That is, a "dual-serving" scheme as described above allows maximal flexibility while keeping the storage on a tolerable level and transmission costs low. The client can always choose the strategy that is optimal for the current needs. The flexibility also includes the fact that not every client needs to implement every strategy. Moreover, the dual serving scheme provides flexibility on the server side, in the sense that the same set of files can be provided for mobile and cable on the server, while the client can decide which strategy is the most optimal one under the current conditions.

Note that, to achieve the above technical advantage, the decoding process includes a dedicated step ensuring that, once the starting point is defined, the remaining refinement order is defined by a canonical and deterministic traversal scheme. This way, single rate or progressive LODs can be used for the next refinement, even though the order of mesh elements is usually not the same.

Figure 1:
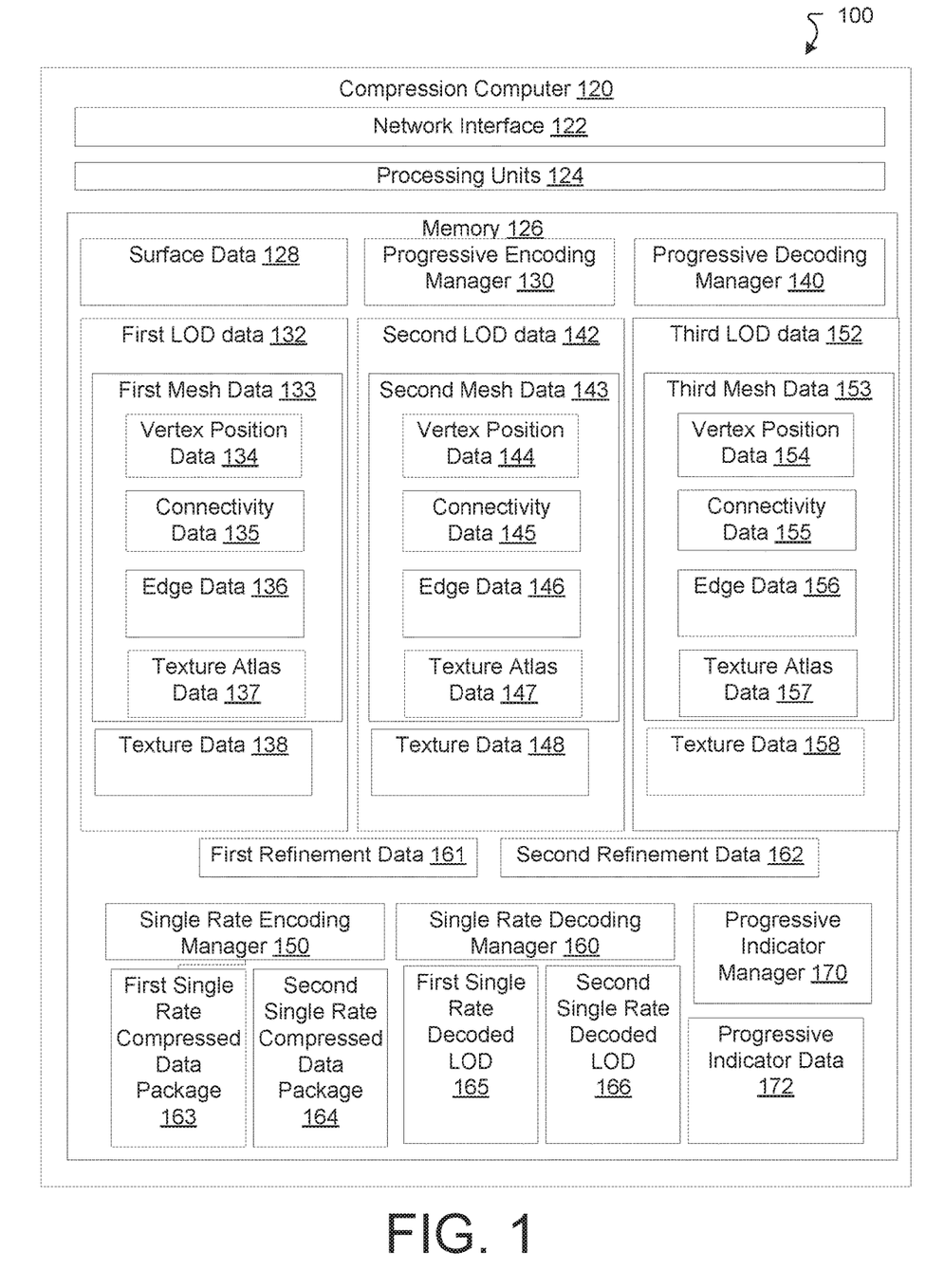
FIG. 1 is a diagram that illustrates an example electronic environment for implementing the technical solution described herein.

FIG. 1 is a diagram that illustrates an example electronic environment 100 in which the above-described technical solution may be implemented. As shown, in FIG. 1, the example electronic environment 100 includes a compression computer 120.

The compression computer 120 is configured to compress data associated with a mesh representing a three-dimensional object. The compression computer 120 includes a network interface 122, one or more processing units 124, and memory 126. The network interface 122 includes, for example, Ethernet adaptors, Token Ring adaptors, and the like, for converting electronic and/or optical signals received from a network to electronic form for use by the compression computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the compression computer 120 can be, or can include processors (e.g., processing units 124) configured to process instructions stored in the memory 126. Examples of such instructions as depicted in FIG. 1A include a progressive encoding manager 130, a progressive decoding manager 140, a single rate encoding manager 150, a single rate decoding manager 160, and a progressive indicator manager 170. Further, as illustrated in FIG. 1, the memory 126 is configured to store various data, which is described with respect to the respective managers that use such data. It is noted that, in some implementations, the progressive encoding manager 170 is not present.

The progressive encoding manager 130 is configured to perform a progressive decoding operation on surface data 128 related to a surface of a three-dimensional object to produce progressive encoded surface data (not shown).

The progressive decoding manager 140 is configured to perform a progressive decoding operation on the progressive encoded surface data to produce (i) first level of detail (LOD) data 132 representing a first LOD the surface, (ii) second LOD data 142 representing a second LOD of the surface that has less detail than the first LOD, (iii) third LOD 152 representing a third LOD of the surface that has less detail than the second LOD, (iv) first refinement data 161 representing the first LOD as a refinement of the second LOD, and (v) second refinement data 161 representing the second LOD as a refinement of the third LOD.

The first LOD data 132 represents a LOD that is input into a LOD reduction operation. The LOD itself represents an approximation to a surface of a three-dimensional object. Such an approximation includes a geometric aspect (e.g., mesh connectivity, vertex coordinates), a texture aspect (texture atlas and coordinates), and an attribute aspect (e.g., normal, color). As shown in FIG. 1, the LOD data 132 includes first mesh data 133, texture data 138, and progressive indicator data 139.

The first LOD data 132 represents the triangular mesh that defines the geometry of the approximation to the surface. The mesh includes vertices, edges connecting the vertices, and triangular faces defined by the edges. As shown in FIG. 1, the first mesh data 133 includes vertex position data 134, connectivity data 135, edge data 136, and texture atlas data 137.

The vertex position data 134 represents the positions of the vertices of the mesh. The positions of the vertices are representations of triplets of real numbers, each triplet being position coordinates of a vertex in space. In some implementations, the position coordinates are quantized so that the real numbers have truncated bit representations. In such an implementation, the vertices are adjusted to lie on a lattice, in which the lattice spacing decreases with the number of bits in the bit representation.

The connectivity data 135 represents the topology and adjacency of the mesh. For example, the connectivity data 135 is used to define a traversal of the mesh. In some implementations, the connectivity data 135 includes triplets of integer indices for each corner of each triangular face of the mesh, each of the triplets including an index identifier of an associated vertex, an index identifier of an opposite corner, and an index identifier of an adjacent corner. The triplets are arranged in an order for traversal of the mesh. Such triplets then provide an ordering of the triangular faces for traversal and an orientation of each triangular face. The positions of the vertices represented by the vertex position data 134 are arranged in an order defined by the index identifiers included in the connectivity data 135. In some implementations, the connectivity data 135 takes the form of a doubly connected edge list, in which an opposing corner is interpreted as a half-edge.

The edge data 136 represents the edges of the mesh as defined by the vertex position data 134. In some implementations, the edges of the mesh are indexed based on the order of the triplets defined by the vertex position data 134.

The texture atlas data 137 represents a texture that may be mapped onto the mesh represented by the first mesh data 133. In some implementations, the texture atlas data 137 includes coordinate pairs within a square or rectangular boundary of a texture atlas. In some implementations, there is more than one texture atlas represented by the texture atlas data 137. In some implementations, the multiple texture atlases share a common UV coordinate system. At each coordinate, there is a scalar quantity representing a brightness or hue of an image. In some implementations, there may be other attributes such as color data for the image; such data may be represented as a triplet or quadruplet of real numbers. In some implementations, the coordinate pairs are quantized, or expressed using a number of bits; that is, the texture atlas includes a grid of coordinates.

The texture atlas data 137 further represents patches of image data such that the data of a patch is mapped to a subset of the triangular faces of the mesh. In some implementations, the texture data 138 also includes seams of the texture atlas, or boundaries of each of the patches. The seams form a subset of the edges represented by the edge data 136.

In some implementations, the texture data 138, if present, represents a texture that may be mapped onto the mesh represented by the first mesh data 133. In some implementations, the texture data 138 includes coordinate pairs within a square or rectangular boundary of a texture atlas. In some implementations, there is more than one texture atlas represented by the texture data 138. In some implementations, the multiple texture atlases share a common UV coordinate system. At each coordinate, there is a scalar quantity representing a brightness or hue of an image. In some implementations, there may be other attributes such as color data for the image; such data may be represented as a triplet or quadruplet of real numbers. In some implementations, the coordinate pairs are quantized, or expressed using a number of bits; that is, the texture atlas includes a grid of coordinates.

The texture data 138 further represents patches of image data such that the data of a patch is mapped to a subset of the triangular faces of the mesh. In some implementations, the texture data 138 also includes seams of the texture atlas, or boundaries of each of the patches. The seams form a subset of the edges represented by the edge data 136.

The second LOD data 142 represents a LOD that is input into the LOD reduction operation. The LOD itself represents an approximation to a surface of a three-dimensional object. Such an approximation includes a geometric aspect (e.g., mesh connectivity, vertex coordinates), a texture aspect (texture atlas and coordinates), and an attribute aspect (e.g., normal, color). As shown in FIG. 1, the LOD data 142 includes first mesh data 143, texture data 148, and progressive indicator data 149.

The first LOD data 142 represents the triangular mesh that defines the geometry of the approximation to the surface. The mesh includes vertices, edges connecting the vertices, and triangular faces defined by the edges. As shown in FIG. 1, the first mesh data 143 includes vertex position data 144, connectivity data 145, edge data 146, and texture atlas data 147.

The vertex position data 144 represents the positions of the vertices of the mesh. The positions of the vertices are representations of triplets of real numbers, each triplet being position coordinates of a vertex in space. In some implementations, the position coordinates are quantized so that the real numbers have truncated bit representations. In such an implementation, the vertices are adjusted to lie on a lattice, in which the lattice spacing decreases with the number of bits in the bit representation.

The connectivity data 145 represents the topology and adjacency of the mesh. For example, the connectivity data 145 is used to define a traversal of the mesh. In some implementations, the connectivity data 145 includes triplets of integer indices for each corner of each triangular face of the mesh, each of the triplets including an index identifier of an associated vertex, an index identifier of an opposite corner, and an index identifier of an adjacent corner. The triplets are arranged in an order for traversal of the mesh. Such triplets then provide an ordering of the triangular faces for traversal and an orientation of each triangular face. The positions of the vertices represented by the vertex position data 144 are arranged in an order defined by the index identifiers included in the connectivity data 145. In some implementations, the connectivity data 145 takes the form of a doubly connected edge list, in which an opposing corner is interpreted as a half-edge.

The edge data 146 represents the edges of the mesh as defined by the vertex position data 144. In some implementations, the edges of the mesh are indexed based on the order of the triplets defined by the vertex position data 144.

The texture atlas data 147 represents a texture that may be mapped onto the mesh represented by the first mesh data 143. In some implementations, the texture atlas data 147 includes coordinate pairs within a square or rectangular boundary of a texture atlas. In some implementations, there is more than one texture atlas represented by the texture atlas data 147. In some implementations, the multiple texture atlases share a common UV coordinate system. At each coordinate, there is a scalar quantity representing a brightness or hue of an image. In some implementations, there may be other attributes such as color data for the image; such data may be represented as a triplet or quadruplet of real numbers. In some implementations, the coordinate pairs are quantized, or expressed using a number of bits; that is, the texture atlas includes a grid of coordinates.

The texture atlas data 147 further represents patches of image data such that the data of a patch is mapped to a subset of the triangular faces of the mesh. In some implementations, the texture data 148 also includes seams of the texture atlas, or boundaries of each of the patches. The seams form a subset of the edges represented by the edge data 146.

In some implementations, the texture data 148, if present, represents a texture that may be mapped onto the mesh represented by the first mesh data 143. In some implementations, the texture data 148 includes coordinate pairs within a square or rectangular boundary of a texture atlas. In some implementations, there is more than one texture atlas represented by the texture data 148. In some implementations, the multiple texture atlases share a common UV coordinate system. At each coordinate, there is a scalar quantity representing a brightness or hue of an image. In some implementations, there may be other attributes such as color data for the image; such data may be represented as a triplet or quadruplet of real numbers. In some implementations, the coordinate pairs are quantized, or expressed using a number of bits; that is, the texture atlas includes a grid of coordinates.

The texture data 148 further represents patches of image data such that the data of a patch is mapped to a subset of the triangular faces of the mesh. In some implementations, the texture data 148 also includes seams of the texture atlas, or boundaries of each of the patches. The seams form a subset of the edges represented by the edge data 146.

The third LOD data 152 represents a LOD that has less detail than the second LOD. The LOD itself represents an approximation to a surface of a three-dimensional object. Such an approximation includes a geometric aspect (e.g., mesh connectivity, vertex coordinates), a texture aspect (texture atlas and coordinates), and an attribute aspect (e.g., normal, color). As shown in FIG. 1, the LOD data 152 includes first mesh data 153, texture data 158, and progressive indicator data 159.

The first LOD data 152 represents the triangular mesh that defines the geometry of the approximation to the surface. The mesh includes vertices, edges connecting the vertices, and triangular faces defined by the edges. As shown in FIG. 1, the first mesh data 153 includes vertex position data 154, connectivity data 155, edge data 156, and texture atlas data 157.

The vertex position data 154 represents the positions of the vertices of the mesh. The positions of the vertices are representations of triplets of real numbers, each triplet being position coordinates of a vertex in space. In some implementations, the position coordinates are quantized so that the real numbers have truncated bit representations. In such an implementation, the vertices are adjusted to lie on a lattice, in which the lattice spacing decreases with the number of bits in the bit representation.

The connectivity data 155 represents the topology and adjacency of the mesh. For example, the connectivity data 155 is used to define a traversal of the mesh. In some implementations, the connectivity data 155 includes triplets of integer indices for each corner of each triangular face of the mesh, each of the triplets including an index identifier of an associated vertex, an index identifier of an opposite corner, and an index identifier of an adjacent corner. The triplets are arranged in an order for traversal of the mesh. Such triplets then provide an ordering of the triangular faces for traversal and an orientation of each triangular face. The positions of the vertices represented by the vertex position data 154 are arranged in an order defined by the index identifiers included in the connectivity data 155. In some implementations, the connectivity data 155 takes the form of a doubly connected edge list, in which an opposing corner is interpreted as a half-edge.

The edge data 156 represents the edges of the mesh as defined by the vertex position data 154. In some implementations, the edges of the mesh are indexed based on the order of the triplets defined by the vertex position data 154.

The texture atlas data 157 represents a texture that may be mapped onto the mesh represented by the first mesh data 153. In some implementations, the texture atlas data 157 includes coordinate pairs within a square or rectangular boundary of a texture atlas. In some implementations, there is more than one texture atlas represented by the texture atlas data 157. In some implementations, the multiple texture atlases share a common UV coordinate system. At each coordinate, there is a scalar quantity representing a brightness or hue of an image. In some implementations, there may be other attributes such as color data for the image; such data may be represented as a triplet or quadruplet of real numbers. In some implementations, the coordinate pairs are quantized, or expressed using a number of bits; that is, the texture atlas includes a grid of coordinates.

The texture atlas data 157 further represents patches of image data such that the data of a patch is mapped to a subset of the triangular faces of the mesh. In some implementations, the texture data 158 also includes seams of the texture atlas, or boundaries of each of the patches. The seams form a subset of the edges represented by the edge data 156.

In some implementations, the texture data 158, if present, represents a texture that may be mapped onto the mesh represented by the first mesh data 153. In some implementations, the texture data 158 includes coordinate pairs within a square or rectangular boundary of a texture atlas. In some implementations, there is more than one texture atlas represented by the texture data 158. In some implementations, the multiple texture atlases share a common UV coordinate system. At each coordinate, there is a scalar quantity representing a brightness or hue of an image. In some implementations, there may be other attributes such as color data for the image; such data may be represented as a triplet or quadruplet of real numbers. In some implementations, the coordinate pairs are quantized, or expressed using a number of bits; that is, the texture atlas includes a grid of coordinates.

The texture data 158 further represents patches of image data such that the data of a patch is mapped to a subset of the triangular faces of the mesh. In some implementations, the texture data 158 also includes seams of the texture atlas, or boundaries of each of the patches. The seams form a subset of the edges represented by the edge data 156.

The first refinement data 161 represents the first LOD as a refinement of the second LOD. In this sense, the first refinement data 161 may represent a recovery of the first LOD from the second LOD. Such a refinement, in some implementations, is effected through a traversal through the first mesh. For example, such a traversal may begin at a corner of a face of the mesh and proceed according to a breadth-first or depth-first traversal. In some implementations, such a traversal may be explicit and uses a bit sequence that indicates a deviation from an implicit traversal.

The second refinement data 162 represents the second LOD as a refinement of the third LOD. In this sense, the second refinement data 162 may represent a recovery of the second LOD from the third LOD. Such a refinement, in some implementations, is effected through a traversal through the first mesh. For example, such a traversal may begin at a corner of a face of the mesh and proceed according to a breadth-first or depth-first traversal. In some implementations, such a traversal may be explicit and uses a bit sequence that indicates a deviation from an implicit traversal.

The single rate encoding manager 150 is configured to perform a single rate encoding operation on the first LOD data 132 to obtain a first single rate compressed data package 163 representing the first LOD. The single rate encoding manager 150 is also configured to perform a single rate encoding operation on the second LOD data 142 to obtain a second single rate compressed data package 164 representing the second LOD.

The single rate decoding manager 160 is configured to perform a single rate decoding of the first single rate compressed data package to produce a first single rate decoded LOD 165, and a single rate decoding of the second single rate compressed data package to produce a second single rate decoded LOD 166.

It is noted that LODs decoded by a progressive decoder and LODs decoded by a single rate decoder are the same. Nevertheless, the data representing these decoded LODs are stored differently in memory. Accordingly, it is not feasible to perform progressive refinement operations on a single rate decoded LOD because the traversal of the mesh will begin at the wrong corner. Thus, if such a refinement is to occur, additional data is needed.

The progressive indicator manager 170 is configured to generate progressive indicator data 172 from the first refinement data 161 and the second single rate-decoded LOD 166. The progressive indicator data 172 represents explicit information used by a progressive decoder so that refinements may be performed on LODs that had been encoded by a single rate encoder, e.g., single rate encoding manager 160. In some implementations, the progressive indicator data represents a location of a corner of the mesh from which a traversal begins, as defined by the connectivity data 145. In some implementations, the progressive indicator data 172 further represents an identifier of a face of the mesh from which the traversal as defined in the connectivity data 145 begins.

The progressive encoding manager 130 and the progressive decoding manager 140 are also configured to perform one of a plurality of LOD reduction processes on the first LOD data 132 to produce the second LOD data 150. For example, the progressive encoding manager 130 and the progressive decoding manager 140 may perform a mesh decimation operation, a XYZ quantization operation, and/or a UV quantization operation.

In some implementations, there are one or more instances of the mesh decimation operation, each being configured to perform a different mesh decimation operation. In some implementations, the decimation operation may include one of a set of edge collapse operations, such as half-edge, mid-edge or a full edge operations. The full-edge collapse operation allows one to place a merged vertex freely. In some implementations, the full-edge collapse operation is configured such that the merged vertex is placed such that an error function (e.g., a quadric error metric or its variants) is minimized. In some implementations, the above-described decimation operations may include a vertex removal operation.

The mesh decimation operation is configured to perform edge collapse operations on the first mesh data 134. In some implementations, the edge collapse operations include a full edge collapse operation and a half-edge collapse operation.

In some implementations, the edge collapse operations performed on the first LOD data 132 are configured to preserve a set of seam edges. In some implementations, the seam edges may be provided alongside with the first LOD. In some implementations, the seam edges may be generated from an abstraction of the reference mesh that is provided alongside with the first LOD.

In some implementations, a LOD reduction process produces an edge collapse from a predefined set of allowed edge collapses. In some implementations, the LOD reduction process may include an edge collapse into the set of allowed edge collapses if the edge collapse does not move a vertex on a seam.

In some implementations, the LOD reduction process in addition produces an edge collapse into the set of allowed edge collapses if the edge is interior to the chain of edges. An edge is interior to a chain if the edge is not one of the two end edges.

Intuitively, such a seam preserving configuration guides the above-described edge collapse process towards the abstraction since a seam is protected from large distortion by never moving a vertex a way from a seam chain. Specifically, this means that a vertex that belongs to more than one chain of edges does not move during any edge collapse.

In some implementations, the texture data, if present, may be reconfigured such that a chain of edges is mapped onto a straight edge in the two-dimensional set of UV coordinates. The straight edge is for example a corresponding edge of a texture atlas generated for the abstraction. The remaining UV coordinates of each polygonal patch may then be embedded inside a polygon which is the corresponding polygon in the texture atlas of the abstraction such that the embedding of UV coordinates is planar. The texture image information is moved accordingly.

If the first LOD and the second LOD are generated by seam preserving edge collapses, the image of the texture atlas of the first LOD can be shared with the resulting texture atlas of the second LOD.

The XYZ quantization operation is performed on the vertex position data 135. In some implementations, the XYZ quantization operation includes decrementing the length of a bit string representing each of the coordinate triplets represented by the vertex position data 135 by one bit. In such implementations, a vertex of the mesh is located at a center of a three-dimensional cell of a lattice. The XYZ quantization operation is configured to move the vertex to the center of a three-dimensional cell of a new lattice that has a larger spacing than the previous lattice.

The UV quantization manager 146 is performed on the texture data 138, specifically a UV quantization operation on UV coordinate pairs represented by the texture data 138. Similar to the XYZ quantization operation, the UV quantization operation is a reduction in which the length of a bit string representing an approximation to the real numbers of the UV coordinates is decremented by a bit. The UV coordinate of the texture atlas is at the center of a cell of a two-dimensional lattice of UV coordinates. The UV quantization manager then moves the coordinate to the center of a cell of a new lattice that has a larger spacing than the previous lattice.

Figure 2:
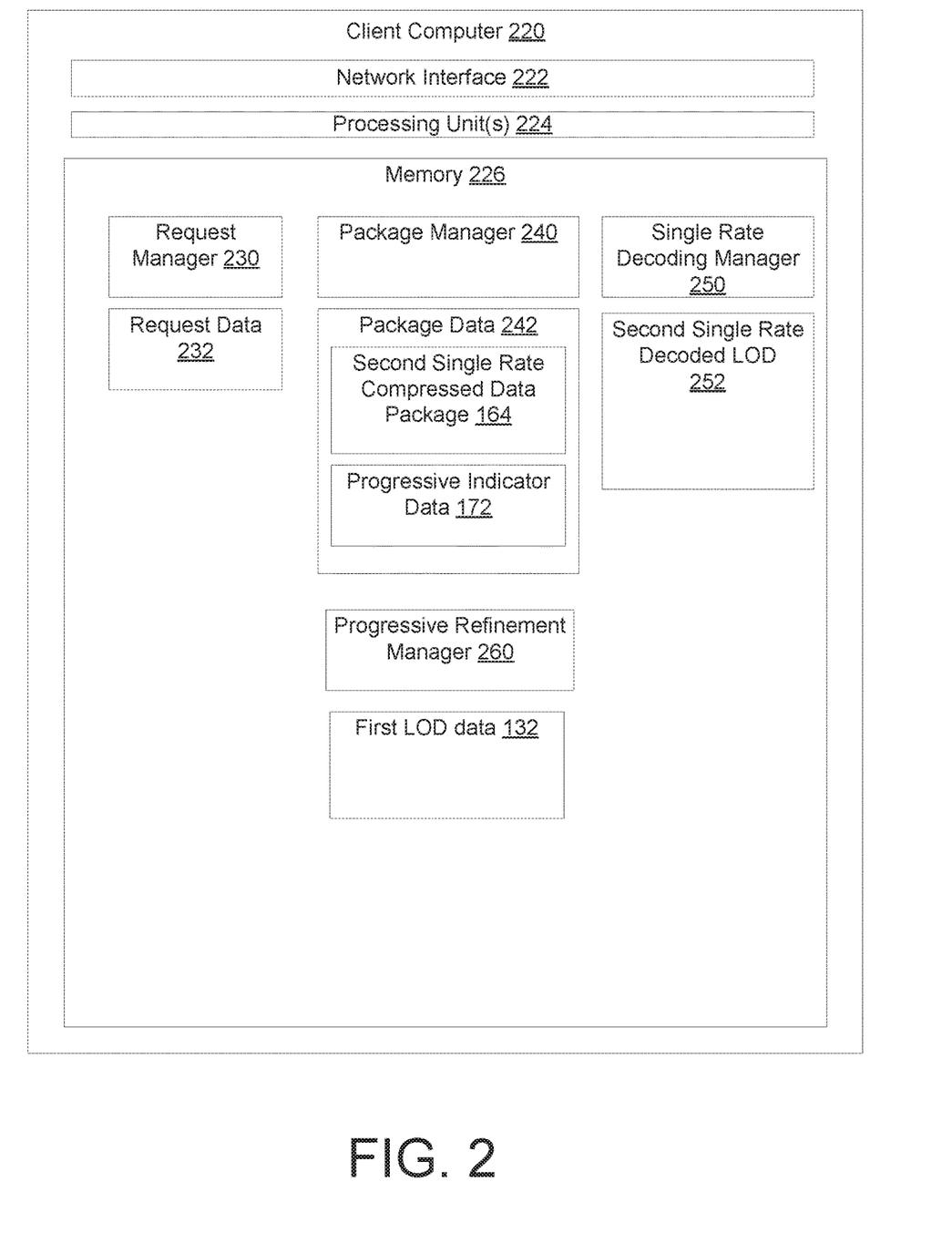
FIG. 2 is a diagram that illustrates an example client which receives encoded LOD data according to the technical solution described herein.

FIG. 2 is a diagram that illustrates an example client computer 220 which receives encoded LOD data according to the technical solution described herein.

The client computer 220 is configured to decompress data associated with a progressive-encoded LOD representing a three-dimensional object. The client computer 220 includes a network interface 222, one or more processing units 224, and memory 226. The network interface 222 includes, for example, Ethernet adaptors, Token Ring adaptors, and the like, for converting electronic and/or optical signals received from a network to electronic from for use by the client computer 220. The set of processing units 224 include one or more processing chips and/or assemblies. The memory 226 includes both volatile memory (e.g., RAM) and non-volatile memory, such as one or more ROMs, disk drives, solid state drives, and the like. The set of processing units 224 and the memory 226 together form control circuitry, which is configured and arranged to carry out various methods and functions as described herein.

In some embodiments, one or more of the components of the client computer 220 can be, or can include processors (e.g., processing units 224) configured to process instructions stored in the memory 226. Examples of such instructions as depicted in FIG. 1 include a request manager 230, a package manager 240, a single rate decoding manager 250, and a progressive refinement manager 260. Further, as illustrated in FIG. 1B, the memory 226 is configured to store various data, which is described with respect to the respective managers that use such data.

The request manager 230 is configured to generate request data 232 and transmit the request data 232 to the compression computer 120. The request data 232 represents a LOD to be viewed by a user using, for example, a mapping application. In some implementations, the request data 232 includes state data. In some implementations, the state data may indicate that a particular LOD is available to the client computer 220 (e.g., on a hard drive). In some implementations, the state data indicates an amount of computing resources available to the client computer 220.

The package manager 240 is configured to receive package data 242 from the compression computer 120 in response to the transmission of the request data 242 to the compression computer 120. The package data 242 includes, as shown in FIG. 2, the second single rate compressed data package 164. In some implementations, the package data 242 also includes the progressive indicator data 172. Accordingly, the package data 242 provides progressive codecs on the client computer with the capability to perform refinements of single rate decoded LODs.

The single rate decoding manager 250 is configured to perform single rate decoding operations in the second single rate compressed data package 164 to produce a second single rate decoded LOD 252 representing the second LOD.

The progressive refinement manager 260 is configured to perform a progressive decoding operation on second single rate decoded LOD 252, using the progressive indicator data 172, to produce the first LOD data 132. Thus, the client computer 220 is able to produce the first LOD from the second LOD without reference to the third LOD.

Note that the progressive refinement manager 260 is configured to decode LODs that have been single rate encoded, either implicitly or using the progressive indicator data 172. Nevertheless, it is not trivial that this can be done. To see why:

Let $M^P(k)$ be the mesh representing the k-th LOD produced by a progressive decoder, and Let $M^S(k)$ be the mesh representing the k-th LOD produced by a single rate decoder. While it is true that $M^P(k)$ and $M^S(k)$ represent the same mesh with the same appearance for the user, they do not have the same representation in memory, as the order in which triangle and vertices have been decoded is not the same. Thus, it is not clear that the progressive decoder can also refine the single rate decoded mesh.

A codec is usually configured to decode as rapidly as possible, while the encoding is a preprocessing. Thus, in order to take any burden from the decoder, the decoder simply starts at the first triangle in memory. As long as decoder and encoder are from the same codec that's not an issue and in fact intended behavior. The encoder essentially simulates the decoder anyway to keep track of the information that the decoder can use at any point in the process. Nevertheless, this is not the case if the to be refined mesh has been encoded and decoded by a different codec, i.e., if that codec is a single rate codec.

Accordingly, a progressive decoder has some preprocessing to find the canonical starting point for every connected component of the mesh:

Implicit: e.g. a process to identify, based on the geometric attributes of the mesh, a unique corner to start the traversal over the current mesh.

Explicit: the progressive decoder may have an additional interface that allows to specify, e.g., the starting corner of the refinement traversal. In some implementations, data indicating the starting corner of the refinement traversal is part of a bitstream. Nevertheless, in such a case one would compute at a point where the progressive decoder starts the refinement in $M^P(k)$, then find information including a face in $M^S(k)$ and the position of the starting corner. This information is stored along with $M^S(k)$.

As shown in FIG. 2, the canonical starting point is provided explicitly, i.e., via progressive indicator data 172. This is preferred because it places the burden of computing on the server rather than the client.

Figure 3A:
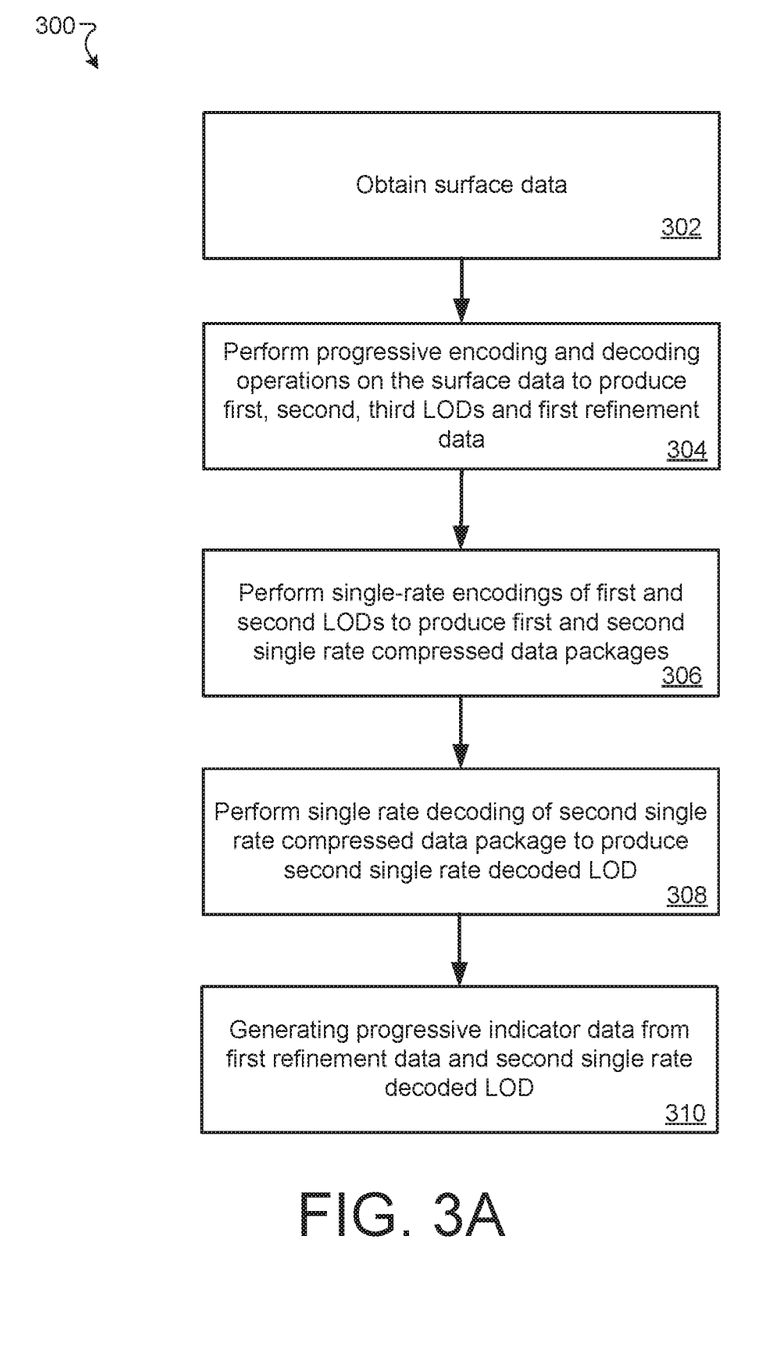
FIG. 3A is a flow chart that illustrates an example method of performing the technical solution within the electronic environment shown in FIG. 1.

FIG. 3A is a flow chart depicting an example method 300 of establishing a dual-serving scheme for LOD sequences. The method 300 may be performed by software constructs described in connection with FIG. 1A, which reside in memory 126 of the user device computer 120 and are run by the set of processing units 124.

At 302, the compression computer 120 receives surface data 128 related to a surface of a three-dimensional object.

At 304, the progressive encoding manager 130 performs a progressive encoding on the surface data to produce progressive encoded surface data, and the progressive decoding manager 140 performs a subsequent progressive decoding operation on the progressive encoded surface data to obtain (i) a first level of detail (LOD) (e.g., first LOD data 132) representing the surface, (ii) a second LOD (e.g., second LOD data 142) representing the surface that has less detail than the first LOD, (iii) a third LOD (e.g., third LOD data 152) representing the surface that has less detail than the second LOD, and (iv) first refinement data 161 representing the first LOD as a refinement of the second LOD.

At 306, the single rate encoding manager 150 performs (a) a single rate encoding of the first LOD to obtain a first single rate compressed data package 163 representing the first LOD and (b) a single rate encoding of the second LOD to obtain a second single rate compressed data package 164 representing the second LOD.

At 308, the single rate decoding manager 160 performs a single rate decoding of the second single rate compressed data package 163 to produce a second single rate decoded LOD 166.

At 310, the progressive indicator manager 170 generates progressive indicator data 172 from the first refinement data 161 and the second single rate decoded LOD 166, the progressive indicator data 172 enabling a refinement of the second single rate decoded LOD 166 in combination with the first refinement data 161.

Figure 3B:
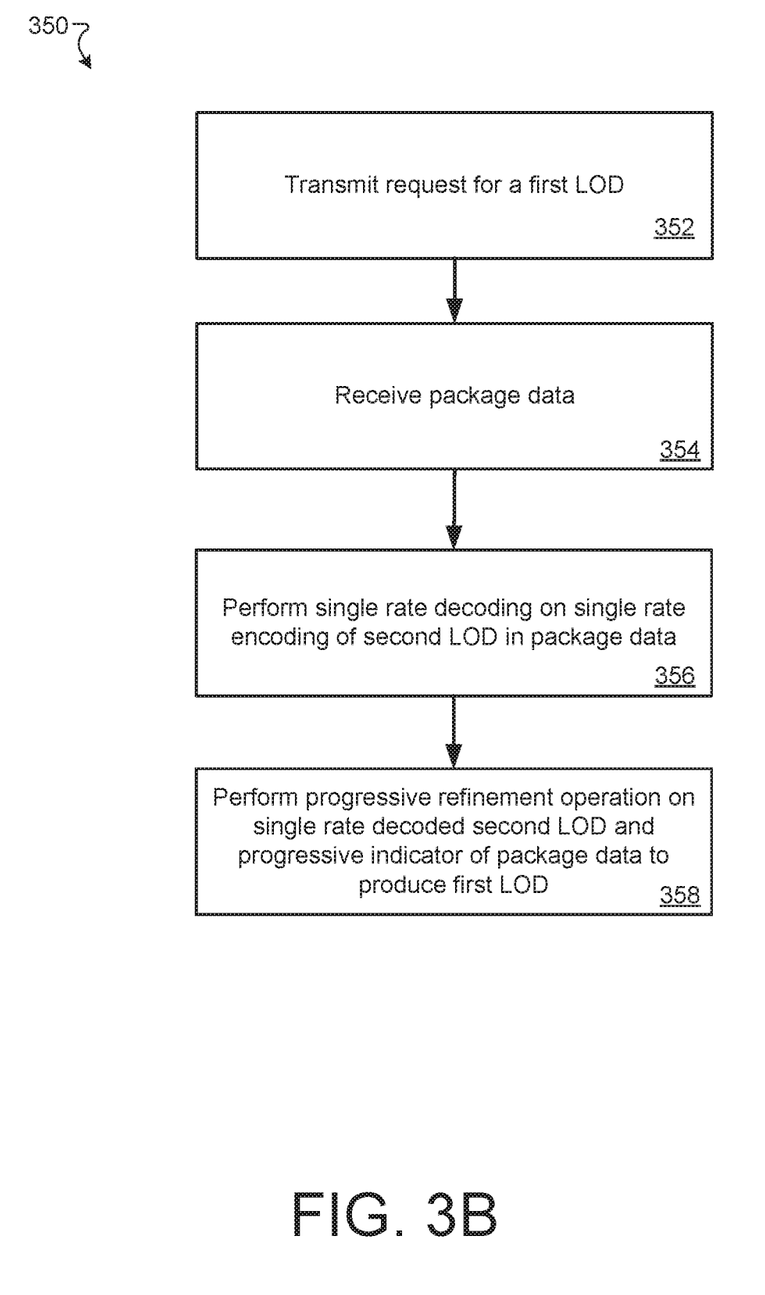
FIG. 3B is a flow chart that illustrates a progressive decoding operation based on the technical solution from the electronic environment illustrated in FIG. 1.

FIG. 3B is a flow chart that illustrates a progressive refinement operation 350 based on the technical solution described herein. The operation 350 may be performed by software constructs described in connection with FIG. 2, which reside in memory 226 of the client computer 220 and are run by the set of processing units 224.

At 352, the request manager 230 transmits, to a server computer (e.g., compression computer 120) a request for a first level of detail (LOD) representing a surface of a three-dimensional object.

At 354, after transmitting the request, the package manager 240 receives, from the server computer, package data 242 including a second single rate compressed data package 164 and progressive indicator data 172, the second single rate compressed data package 164 including a single rate encoding of a second LOD, the second LOD representing the surface with less detail than the first LOD.

At 356, the single rate decoding manager 250 performs a single rate decoding operation on the single rate encoding of the second LOD to produce a single rate decoded second LOD 252.

At 358, the progressive refinement manager 260 performs a progressive refinement operation on the single rate decoded second LOD and the progressive indicator 172 as described above to produce the first LOD.

Figure 4:
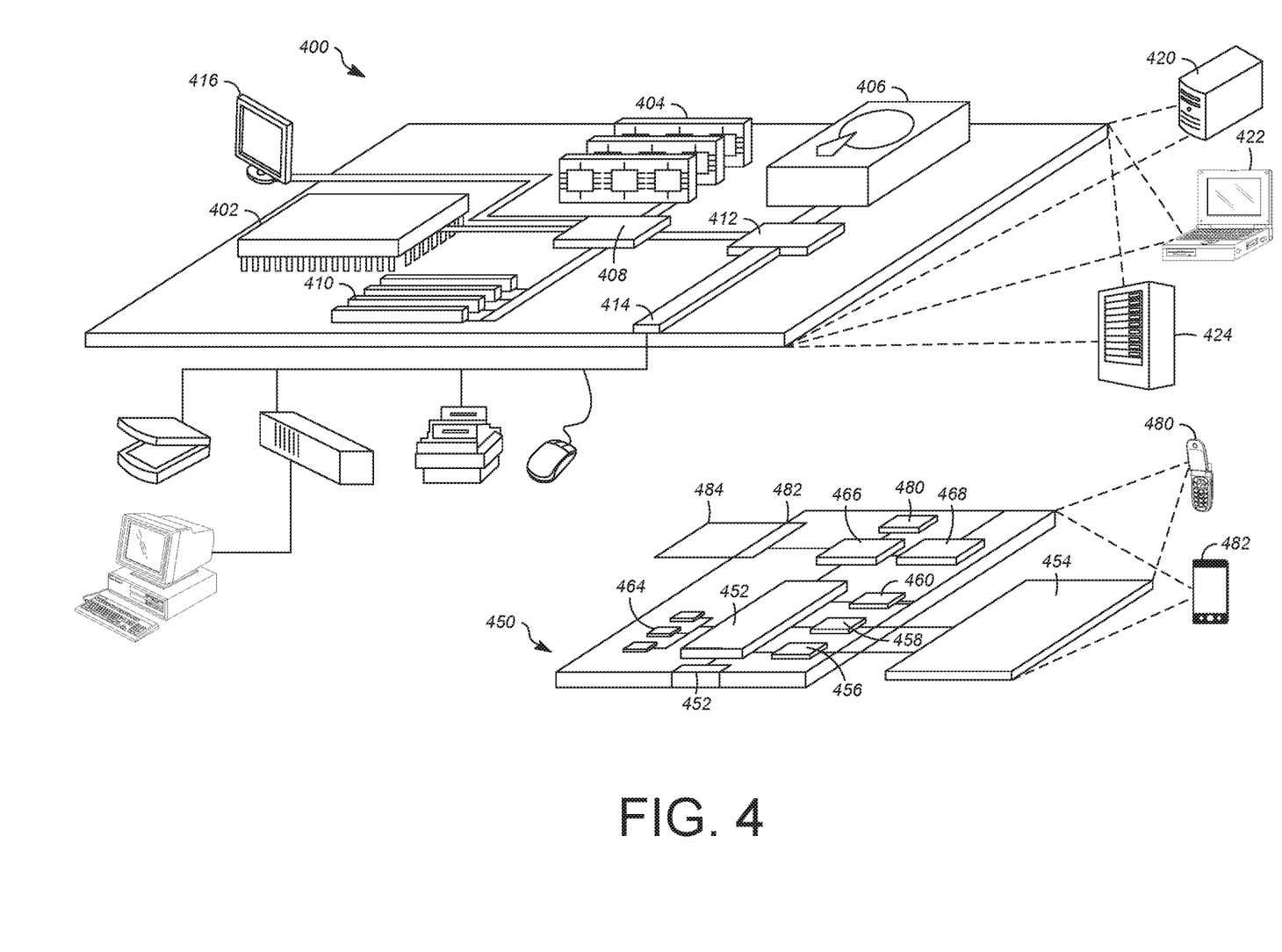
FIG. 4 illustrates an example of a computer device and a mobile computer device that can be used with circuits described here.

FIG. 4 shows an example of a generic computer device 400 and a generic mobile computer device 450, which may be used with the techniques described here. Computing device 400 is intended to represent various forms of digital computers, such as laptops, desktops, tablets, workstations, personal digital assistants, televisions, servers, blade servers, mainframes, and other appropriate computing devices. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. The processor 402 can be a semiconductor-based processor. The memory 404 can be a semiconductor-based memory. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, Wi-Fi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent exemplary functional relationships and/or physical or logical couplings between the various elements. Many alternative or additional functional relationships, physical connections or logical connections may be present in a practical device. Moreover, no item or component is essential to the practice of the embodiments disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Further, in this specification and the appended claims, the singular forms "a," "an" and "the" do not exclude the plural reference unless the context clearly dictates otherwise. Moreover, conjunctions such as "and," "or," and "and/or" are inclusive unless the context clearly dictates otherwise. For example, "A and/or B" includes A alone, B alone, and A with B.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Returning to FIG. 1, in some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the compression computer 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the compression computer 120.

The components (e.g., modules, processing units 124) of the compression computer 120 can be configured to operate based on one or more platforms (e.g., one or more similar or different platforms) that can include one or more types of hardware, software, firmware, operating systems, runtime libraries, and/or so forth. In some implementations, the components of the compression computer 120 can be configured to operate within a cluster of devices (e.g., a server farm). In such an implementation, the functionality and processing of the components of the compression computer 120 can be distributed to several devices of the cluster of devices.

The components of the compression computer 120 can be, or can include, any type of hardware and/or software configured to process attributes. In some implementations, one or more portions of the components shown in the components of the compression computer 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the compression computer 120 can be, or can include, a software module configured for execution by at least one processor (not shown). In some implementations, the functionality of the components can be included in different modules and/or different components than those shown in FIG. 1.

Although not shown, in some implementations, the components of the compression computer 120 (or portions thereof) can be configured to operate within, for example, a data center (e.g., a cloud computing environment), a computer system, one or more server/host devices, and/or so forth. In some implementations, the components of the compression computer 120 (or portions thereof) can be configured to operate within a network. Thus, the components of the compression computer 120 (or portions thereof) can be configured to function within various types of network environments that can include one or more devices and/or one or more server devices. For example, a network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the compression computer 120 can be, or can include, processors configured to process instructions stored in a memory. For example, the LOD manager 130 (and/or a portion thereof), the LOD reduction manager 140 (and/or a portion thereof), the cost metric manager 160 (and/or a portion thereof), and the selection manager 170 (and/or a portion thereof) can be a combination of a processor and a memory configured to execute instructions related to a process to implement one or more functions.

A number of embodiments have been described. Nevertheless, it will be understood that various modifications may be made without departing from the spirit and scope of the specification.

For example, in some implementations, the method further includes receiving, from a client computer, a request indicating the first LOD and in response to the request, transmitting, to the client computer, package data including the second single rate compressed data package and the progressive indicator data to the client computer, the client computer being configured to generate the first LOD from the second single rate compressed data package and the progressive indicator data.

In some implementations, the method further includes receiving, from a client computer, a request indicating the first LOD, the request including state data indicating a state of the client computer; in response to receiving the request, performing a package selection operation based on the state data to produce, as selected package data, one of (i) first package data including the first refinement data to the client computer, (ii) second package data including the first refinement data and the progressive indicator data to the client computer, and (iii) third package data including the first single rate compressed data package; and transmitting, to the client computer, the selected package data.

In some implementations, the state data indicates that the second LOD is available to the client computer as the second progressive decoded LOD; and the selected package data is the first package data.

In some implementations, the state data indicates that the second LOD is available to the client computer as the second single rate decoded LOD, and the selected package data is the second package data.

In some implementations, the first LOD includes a first mesh LOD for the surface, the first mesh LOD including a first plurality of faces and the second LOD includes a second mesh LOD for the surface, the second mesh LOD including a second plurality of faces and performing the progressive encoding operation includes performing a mesh reduction operation on the first mesh LOD to produce the second mesh LOD.

In some implementations, the progressive indicator data includes a corner identifier identifying an initial corner of a face of the second plurality of faces from which a traversal of the second mesh LOD is defined.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
   receiving, by processing circuitry of a server computer, surface data related to a surface of a three-dimensional object;
   performing, by the processing circuitry, (a) a progressive encoding on the surface data to produce progressive encoded surface data and (b) a progressive decoding operation on the progressive encoded surface data to obtain (i) a first level of detail (LOD) representing the surface, (ii) a second LOD representing the surface that has less detail than the first LOD, (iii) a third LOD representing the surface that has less detail than the second LOD, and (iv) first refinement data representing the first LOD as a refinement of the second LOD, the first LOD including a first mesh LOD for the surface, the first mesh LOD including a first plurality of faces and the second LOD includes a second mesh LOD for the surface, the second mesh LOD including a second plurality of faces;
   performing, by the processing circuitry, (a) a single rate encoding of the first LOD to obtain a first single rate compressed data package representing the first LOD and (b) a single rate encoding of the second LOD to obtain a second single rate compressed data package representing the second LOD;
   performing, by the processing circuitry, a single rate decoding of the second single rate compressed data package to produce a second single rate decoded LOD; and
   generating, by the processing circuitry, progressive indicator data from the first refinement data and the second single rate-decoded LOD, the progressive indicator data enabling a refinement of the second single rate decoded LOD in combination with the first refinement data, the progressive indicator data including a corner identifier identifying an initial corner of a face of the second plurality of faces from which a traversal of the second mesh LOD is defined, the initial corner of the face being associated with a triplet of indices, the triplet including index identifiers of an associated vertex, an opposite corner, and an adjacent corner.

2. The method as in claim 1, further comprising:
receiving, from a client computer, a request indicating the first LOD; and
in response to the request, transmitting, to the client computer, package data including the second single rate compressed data package and the progressive indicator data to the client computer, the client computer being configured to generate the first LOD from the second single rate compressed data package and the progressive indicator data.

3. The method as in claim 1, further comprising:
receiving, from a client computer, a request indicating the first LOD, the request including state data indicating a state of the client computer;
in response to receiving the request, performing a package selection operation based on the state data to produce, as selected package data, one of (i) first package data including the first refinement data to the client computer, (ii) second package data including the first refinement data and the progressive indicator data to the client computer, or (iii) third package data including the first single rate compressed data package; and
transmitting, to the client computer, the selected package data.

4. The method as in claim 3, wherein the state data indicates that the second LOD is available to the client computer as the second progressive decoded LOD, and
wherein the selected package data is the first package data.

5. The method as in claim 3, wherein the state data indicates that the second LOD is available to the client computer as the second single rate decoded LOD, and
wherein the selected package data is the second package data.

6. The method as in claim 1,
wherein performing the progressive encoding operation includes performing a mesh reduction operation on the first mesh LOD to produce the second mesh LOD.

7. The method as in claim 1, wherein the progressive indicator data further includes a face identifier identifying the face from which the traversal of the second mesh LOD begins.

8. A method, comprising:
transmitting, to a server computer by processing circuitry of a client computer, a request for a first level of detail (LOD) representing a surface of a three-dimensional object;
after transmitting the request, receiving, by the processing circuitry from the server computer, package data including a second single rate compressed data package and progressive indicator data, the second single rate compressed data package including a single rate encoding of a second LOD, the second LOD representing the surface with less detail than the first LOD, the first LOD including a first mesh LOD for the surface, the first mesh LOD including a first plurality of faces and the second LOD includes a second mesh LOD for the surface, the second mesh LOD including a second plurality of faces, the progressive indicator data including a corner identifier identifying an initial corner of a face of the second plurality of faces from which a traversal of the second mesh LOD is defined, the initial corner of the face being associated with a triplet of indices, the triplet including index identifiers of an associated vertex, an opposite corner, and an adjacent corner;
performing, by the processing circuitry, a single rate decoding operation on the single rate encoding of the second LOD to produce a single rate decoded second LOD; and
performing, by the processing circuitry, a progressive refinement operation on the single rate decoded second LOD and the progressive indicator data to produce the first LOD.

9. A computer program product comprising a nontransitory storage medium, the computer program product including code that, when executed by processing circuitry of a user device configured to encode information related to a surface of a three-dimensional object, causes the processing circuitry to perform a method, the method comprising:
receiving surface data related to a surface of a three-dimensional object;
performing (a) a progressive encoding on the surface data to produce progressive encoded surface data and (b) a progressive decoding operation on the progressive encoded surface data to obtain (i) a first level of detail (LOD) representing the surface, (ii) a second LOD representing the surface that has less detail than the first LOD, (iii) a third LOD representing the surface that has less detail than the second LOD, and (iv) first refinement data representing the first LOD as a refinement of the second LOD, the first LOD including a first mesh LOD for the surface, the first mesh LOD including a first plurality of faces and the second LOD includes a second mesh LOD for the surface, the second mesh LOD including a second plurality of faces;
performing (a) a single rate encoding of the first LOD to obtain a first single rate compressed data package representing the first LOD and (b) a single rate encoding of the second LOD to obtain a second single rate compressed data package representing the second LOD;
performing a single rate decoding of the second single rate compressed data package to produce a second single rate decoded LOD; and
generating progressive indicator data from the first refinement data and the second single rate-decoded LOD, the progressive indicator data representing data from which the first LOD is obtained from the second LOD after performing the progressive decoding operation, the progressive indicator data including a corner identifier identifying an initial corner of a face of the second plurality of faces from which a traversal of the second mesh LOD is defined, the initial corner of the face being associated with a triplet of indices, the triplet including index identifiers of an associated vertex, an opposite corner, and an adjacent corner.

10. The computer program product as in claim 9, wherein the method further comprises:
receiving, from a client computer, a request indicating the first LOD; and
in response to the request, transmitting, to the client computer, package data including the second single rate compressed data package and the progressive indicator data to the client computer, the client computer being configured to generate the first LOD from the second single rate compressed data package and the progressive indicator data.

11. The computer program product as in claim 9, wherein the method further comprises:

receiving, from a client computer, a request indicating the first LOD, the request including state data indicating a state of the client computer;

in response to receiving the request, performing a package selection operation based on the state data to produce, as selected package data, one of (i) first package data including the first refinement data to the client computer, (ii) second package data including the first refinement data and the progressive indicator data to the client computer, or (iii) third package data including the first single rate compressed data package; and transmitting, to the client computer, the selected package data.

12. The computer program product as in claim 11, wherein the state data indicates that the second LOD is available to the client computer as the second progressive decoded LOD, and wherein the selected package data is the first package data.

13. The computer program product as in claim 11, wherein the state data indicates that the second LOD is available to the client computer as the second single rate decoded LOD, and wherein the selected package data is the second package data.

14. An electronic apparatus configured to encode information related to a surface of a three-dimensional object, the electronic apparatus comprising:

memory; and controlling circuitry coupled to the memory, the controlling circuitry being configured to:

receive surface data related to a surface of a three-dimensional object;

perform (a) a progressive encoding on the surface data to produce progressive encoded surface data and (b) a progressive decoding operation on the progressive encoded surface data to obtain (i) a first level of detail (LOD) representing the surface, (ii) a second LOD representing the surface that has less detail than the first LOD, (iii) a third LOD representing the surface that has less detail than the second LOD, and (iv) first refinement data representing the first LOD as a refinement of the second LOD, the first LOD including a first mesh LOD for the surface, the first mesh LOD including a first plurality of faces and the second LOD includes a second mesh LOD for the surface, the second mesh LOD including a second plurality of faces;

perform (a) a single rate encoding of the first LOD to obtain a first single rate compressed data package representing the first LOD and (b) a single rate encoding of the second LOD to obtain a second single rate compressed data package representing the second LOD;

perform a single rate decoding of the second single rate compressed data package to produce a second single rate decoded LOD; and generate progressive indicator data from the first refinement data and the second single rate-decoded LOD, the progressive indicator data representing data from which the first LOD is obtained from the second LOD after performing the progressive decoding operation, the progressive indicator data including a corner identifier identifying an initial corner of a face of the second plurality of faces from which a traversal of the second mesh LOD is defined, the initial corner of the face being associated with a triplet of indices, the triplet including index identifiers of an associated vertex, an opposite corner, and an adjacent corner.

15. The electronic apparatus as in claim 14, wherein the controlling circuitry is further configured to:

receive, from a client computer, a request indicating the first LOD; and in response to the request, transmit, to the client computer, package data including the second single rate compressed data package and the progressive indicator data to the client computer, the client computer being configured to generate the first LOD from the second single rate compressed data package and the progressive indicator data.

16. The electronic apparatus as in claim 14, wherein the controlling circuitry is further configured to:

receive, from a client computer, a request indicating the first LOD, the request including state data indicating a state of the client computer;

in response to receiving the request, perform a package selection operation based on the state data to produce, as selected package data, one of (i) first package data including the first refinement data to the client computer, (ii) second package data including the first refinement data and the progressive indicator data to the client computer, or (iii) third package data including the first single rate compressed data package; and transmit, to the client computer, the selected package data.

17. The electronic apparatus as in claim 16, wherein the state data indicates that the second LOD is available to the client computer, and wherein the selected package data is the first package data.

18. The electronic apparatus as in claim 16, wherein the state data indicates that the second LOD is available to the client computer as the second single rate decoded LOD, and wherein the selected package data is the second package data.

\* \* \* \* \*